United States Patent
Barth et al.

(10) Patent No.: US 7,596,850 B2
(45) Date of Patent: Oct. 6, 2009

(54) METHOD FOR TEMPORARILY INACTIVATING A WIRELESS COMMUNICATION DEVICE

(75) Inventors: Steven A. Barth, Martinsville, VA (US); Lisa Y. Winckler, Collinsville, VA (US); Timothy J. Hood, Martinsville, VA (US); Deron Simpson, Finksburg, MD (US)

(73) Assignee: CPFilms Inc., Martinsville, VA (US)

( * ) Notice: Subject to any disclaimer, the term of this patent is extended or adjusted under 35 U.S.C. 154(b) by 613 days.

(21) Appl. No.: 10/552,627

(22) PCT Filed: Apr. 14, 2004

(86) PCT No.: PCT/US2004/009288

§ 371 (c)(1), (2), (4) Date: Oct. 7, 2005

(87) PCT Pub. No.: WO2004/092037

PCT Pub. Date: Oct. 28, 2004

(65) Prior Publication Data

US 2006/0196792 A1     Sep. 7, 2006

Related U.S. Application Data

(60) Provisional application No. 60/462,335, filed on Apr. 14, 2003.

(51) Int. Cl.
     *H04R 31/00*      (2006.01)

(52) U.S. Cl. .......................... 29/594; 29/417; 29/592.1; 29/609.1; 257/704; 257/723; 257/724; 257/729; 257/730; 381/170; 381/361; 381/355; 381/358; 381/360

(58) Field of Classification Search ................... 29/417, 29/592.1, 594, 609.1; 381/170, 355, 358, 381/360, 361, 368, 369; 257/704, 723, 724, 257/729, 730
See application file for complete search history.

(56) References Cited

U.S. PATENT DOCUMENTS

| 4,125,665 | A | * | 11/1978 | Bemmels et al. | ............ | 428/352 |
| 4,747,499 | A | * | 5/1988 | Gach et al. | ............ | 215/250 |
| 6,700,061 | B2 | * | 3/2004 | Kishimoto | ............ | 174/377 |

* cited by examiner

*Primary Examiner*—Paul D Kim
(74) *Attorney, Agent, or Firm*—Bacon & Thomas, PLLC

(57) ABSTRACT

A wireless communication device such as a cell phone is rendered temporarily inoperable by enclosing the device in a container such as a heat sealable bag (1) which has been metallized so that when the device (2) is sealed in the container (1) it is surrounded by a metal layer (9) which blocks signals to and from the device (3) to thereby render it inoperable. The device is sealed within the container (1) by a seal such as a heat seal which will reveal any attempt to remove the device from the container.

9 Claims, 3 Drawing Sheets

METHOD FOR TEMPORARILY INACTIVATING A WIRELESS COMMUNICATION DEVICE

BACKGROUND OF THE INVENTION (1) Field of the Invention

This invention pertains to the field of wireless communication devices such as cell phones, satellite phones and PDAs (personal digital assistants). More particularly this invention pertains to a container for such a device which blocks the wavelengths needed to receive or send messages and which preferably can be sealed in such a manner so that removal of the device from the sealed container can be detected by observing a broken seal or other broken portions of the container.

(2) Description of Related Art

In some environments, particularly indoor environments where wireless communications (i.e., cell phones and PDAs) are not desired such as aircraft, hospitals and certain government and military buildings and installations, it is sometimes necessary for individuals to surrender their wireless communication device to a security guard or other personnel before access can be granted. Preventing individuals from using such wireless communication devices, especially popular cell phones, assures that the wavelengths in which these devices operate can be blocked or reduced in certain restricted areas where these wavelengths are unwanted. These wavelengths or signals are considered undesirable in certain environments for a variety of reasons. For example these signals may interfere with other desirable signals. In some instances a general reduction of various wireless signals is required. In addition the use of such wireless communication devices may constitute a security risk which is best avoided by prohibiting the use of such devices within certain environments such as high security areas.

Typically such restricted areas or high security areas have many visitors who have such wireless communication devices in their possession and who wish to gain entry into the restricted area. Such individuals must temporarily surrender possession of their wireless communication devices while they are within the restricted site. The surrendered wireless communication devices must be returned to the appropriate individuals when they leave the restricted site. Returning each wireless communication device to the correct owner requires extensive record keeping and storage and retrieval of the device. Despite careful attention to detail in this regard, sometimes the wrong communication device is returned to a visitor.

The need for a security guard and the above-noted record keeping, storage and retrieval of the wireless communication device constitutes a burden which could be eliminated if the devices could be inactivated while they are within the restricted area. Temporary inactivation of the devices would allow the individuals to maintain possession of their wireless communication devices while they are within the restricted area and thus would eliminate the necessity of the above-noted record keeping, storage and retrieval of the devices and would eliminate the possibility that the wrong device would be returned to an individual.

Prior to this invention there were no known simple ways to temporarily inactivate these wireless communication devices so that individuals could retain possession of them while they are within the restricted area.

SUMMARY OF THE INVENTION

It is an objective of this invention to provide a closeable container which blocks signals from either leaving or being received by the device while the device is within the closed container.

It is also an objective of this invention to provide a sealable container which blocks signals from either leaving or being received by the device while the device is sealed within the container by use of a seal which cannot be readily broken without causing observable or permanent evidence of the broken seal (i.e., the seal is not readily re-sealable after the initial breaking of the seal so that an initial breaking of the seal cannot be concealed).

It is a further objective of this invention to provide a functioning wireless communication device contained or sealed within the above-described container or sealable container so that a person in possession of such a device cannot use the device while it is inside the container and so that a person in possession of such a device which is sealed in the container cannot secretly remove the device from the container to use it without causing observable or permanent evidence that the device has been removed from the container.

It is a further objective of this invention to provide a procedure which prevents individuals in possession of a wireless communication device from secretly using the device in a restricted area.

These and other objectives are achieved by providing the container of this invention. The container includes a signal shielding layer which may be a microwave absorbing layer or an electrically conductive layer such as a metal. The container is configured so that it surrounds the wireless communication device with the signal shielding layer to thereby block or attenuate the electromagnetic radiation signals such as infrared radiation (IR) utilized by the device so that the device is not functionable while it is within the container. In addition the container preferably includes a seal which seals the container in which the device has been inserted. The seal prevents the container from being opened without breaking the seal or other portion of the container. Furthermore, in a preferred embodiment the seal is non-resealable so that once the seal has been broken, the container cannot be resealed without showing evidence of the initial breaking of the seal. Thus in a preferred embodiment, if an individual in possession of a wireless electrical communication device opens the container so that the device can be removed and used, the container cannot be restored to its closed or sealed configuration.

In a broader aspect, this invention may be practiced without the seal in instances where it is only desired to prevent operation of the communication device without providing the security feature that the seal provides. In this broader aspect of the invention it is only necessary to surround the communication device with the signal shielding layer of the container. In instances where the container is a bag, the communication device may be adequately surrounded by closing the bag and folding it with the communication device therein. In all embodiments of the invention the term "surround" means that there are no gaps or openings in the signal shielding layer which would allow the passage of the signal therethrough to an extent which would permit operation of the device. Thus in instances where a non-resealable seal is not used to close the container, other conventional closures may be utilized. For example conventional bag closures or resealable seals may be used for bag containers. Resealable seals include, for example, pressure sensitive adhesive (e.g., repositionable pressure sensitive adhesive) coated onto a surface of the bag material in the area where a seal is desired. Various types acrylate polymer and copolymer adhesive compositions are well known for this purpose. A release layer may be used to protect the adhesive prior to its use.

Microwave absorptive material may be used to surround communication devices which operate in the microwave wavelengths to provide the required shielding effect of this invention. Thus cell phones or other communication devices which operate in the microwave frequency may use the above-described material or microwave absorptive material to surround the device.

In operation the wireless communication device of an individual who seeks entry into a restricted area is sealed in the container before the individual is allowed to enter the restricted area with the device. Once the device has been sealed in the container, it cannot be used due to the shielding effect of the signal shielding layer which surrounds the device. Furthermore, in a preferred embodiment the container cannot be opened without breaking the seal or other portion of the container and once the seal or other portion of the container has been broken to facilitate removal of the device therefrom, the broken seal or broken container provides evidence that the device has been removed and possibly used in the restricted area where such use is prohibited. Before leaving the restricted area, the individual will be required to show the container to security personnel who will visually inspect the container to see if the seal or other portion of the container has been opened. Lastly the security personnel or the individual may remove the phone from the container after it has been inspected.

It is advantageous to inform the individuals prior to their entry into a restricted area that the device cannot be utilized while it is sealed in the container and that the sealed container which employs a non-resealable seal cannot be opened and then restored to its sealed condition and that the container will be inspected before the individual leaves the premises. Conveying this information to the individual will discourage the individual from taking steps to use the device in violation of the restrictions since the individual will know that attempted use will be discovered.

When the individual is ready to leave the restricted area and after the aforementioned inspection has been completed, the wireless communication device is returned to the individual.

The container is advantageously disposable. Preferably the container is a bag which is coated or laminated with a signal shielding layer (i.e., a metal layer or other conductive material or microwave absorptive material) which blocks the electromagnetic signals utilized by the wireless communication device. The bag preferably has a heat sealable opening and is of an appropriate size so that the wireless communication device can be inserted completely into the bag and thereafter sealed therein by heat sealing the open end of the bag. In other words the heat sealable opening is heat sealed to effect the sealing of the bag. Tearing apart the heat sealed portions of the bag will open the bag, but once it has been opened, it cannot be easily resealed by the individual. Thus, a broken seal is readily detectable by visual inspection. Likewise, tears in the bag are also readily detectable by visual inspection.

Although a heat seal is preferred for the non-resealable seal used in this invention, other types of seals which are well known to those skilled in the art may be utilized. For example, pressure sensitive adhesives may be used to make the seal. Thus, a pressure sensitive adhesive layer may be used in place of the heat seal layer described herein. Preferably, when using a heat seal adhesive, the adhesive composition utilized should provide an adhesive seal which has a bonding strength in excess of the tear strength of the layer or layers being adhered by the adhesive so that any attempt to open the seal will be revealed by tearing.

Conventional cohesive seals may also be used in this invention.

Conventional heat sealable bags which are well known to those skilled in the art, may be used in the present invention. Such bags are known for use as packages for various types of foods such as snacks, cookies, chips, etc. Many of these conventional heat sealable bags are metallized by various known procedures (i.e., coated or laminated with a metal layer) to provide a metal layer which preserves freshness. These types of bags may be used in the present invention. The metallized bags may be made from stock metallized plastic sheets according to known manufacturing techniques. Conventional metal coating and laminating techniques may be used to apply the metal onto the material which is used to make the bag.

The present invention may be used with any type of wireless communication device including cell phones, satellite phones, PDAs, walkie-talkies, etc. The term "cell phone" as used herein refers to any wireless telephone which sends and receives electromagnetic communication signals (e.g., microwaves) even if cell towers are not utilized and even if the phones utilized in a conversation depend at least in part upon conventional telephone lines to complete the call. Henceforth the invention will be described with respect to cell phones, it being understood however that the below discussion with respect to cell phones also applies to any wireless communication device.

The metal coating or lamina is preferably aluminum although any conductive metal such as copper may be used. The metal may be coated or laminated onto any conventional material from which a bag can be fabricated. Preferably continuous (containing no holes or perforations) plastic stock material is used to make the metallized material from which the bags are fabricated.

The signals are blocked by being attenuated by the shielding layer (metal or other conductive layer or by the microwave absorptive material which attenuates the signal by absorption). The amount or thickness of the shielding layer (e.g., microwave absorptive material or conducive material such as metal) determines the amount of signal attenuation which is achieved when the conductive material surrounds the cell phone. Although substantially complete signal attenuation is desirable and easily achievable by surrounding the phone with a thin metal layer, 100% attenuation is generally not required to achieve the benefits of this invention.

The amount of signal attenuation which is desired may be set or determined by the operator or owners of the facility in which it is desirable to prevent wireless communications. For example, a government agency may determine the amount of attenuation which is required to meet their objective. At least 80% signal attenuation is preferred.

In order to maximize the degree of signal attenuation for any given thickness of signal shielding layer, e.g., conductive coating such as metal, the antenna of the cell phone should not come in contact with the signal shielding layer (coating or lamina). Preferably the antenna is held in a spaced apart relationship with the bag (or other container) by inserting a spacer between the phone and the bag in which the phone is located. Suitable spacer materials include plastic foam, and various types of package cushioning material such as blister pack. Essentially the spacer material can be any type of bulky material which can be placed between the phone and the bag so that the phone does not come in contact with the bag and remains spaced apart therefrom.

DETAILED DESCRIPTION OF THE INVENTION AND PREFERRED EMBODIMENTS

Figure 1:
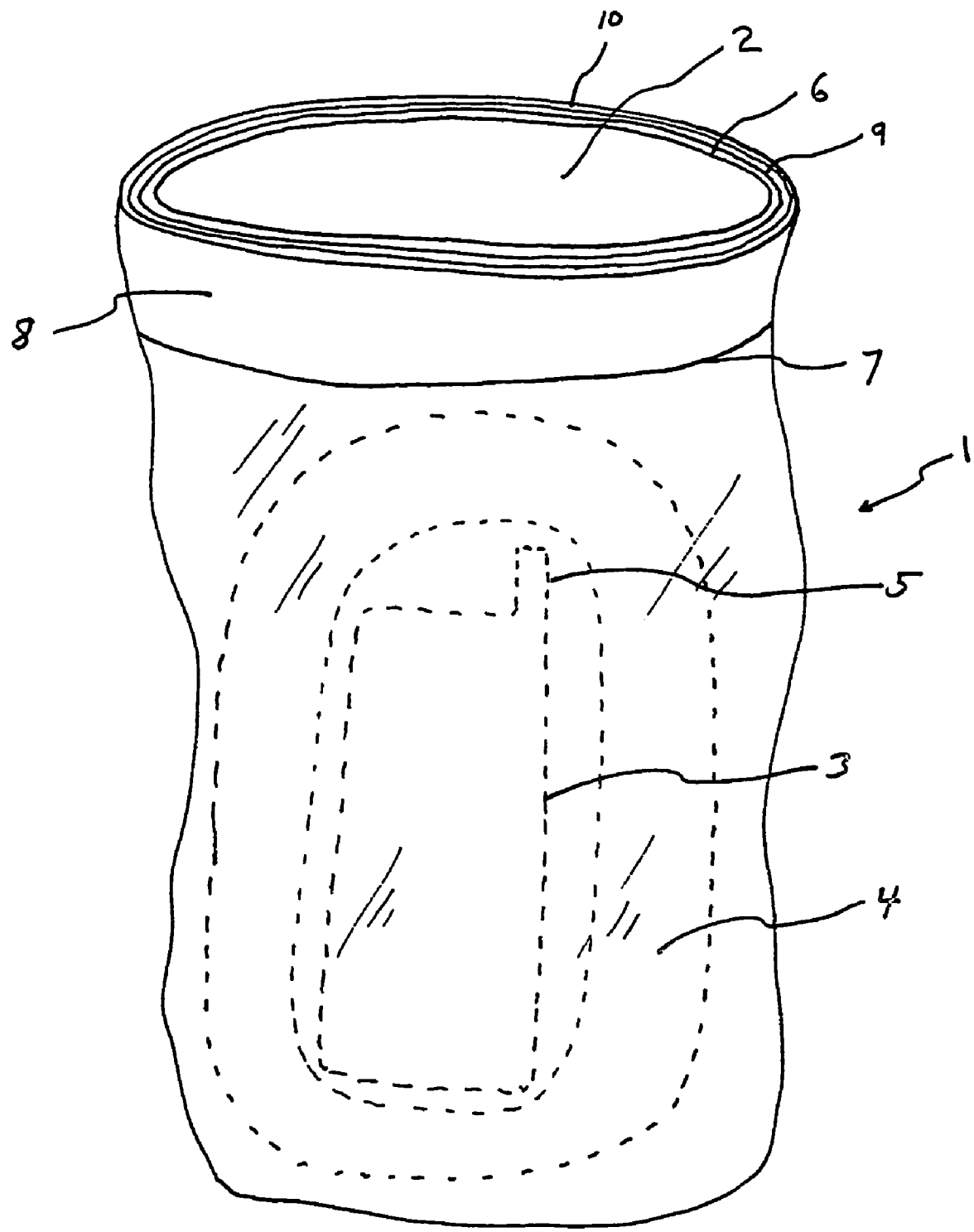
FIG. 1 is a perspective view of an embodiment of the invention which is a metallized bag with a cell phone contained therein before the bag has been sealed.
Figure 2:
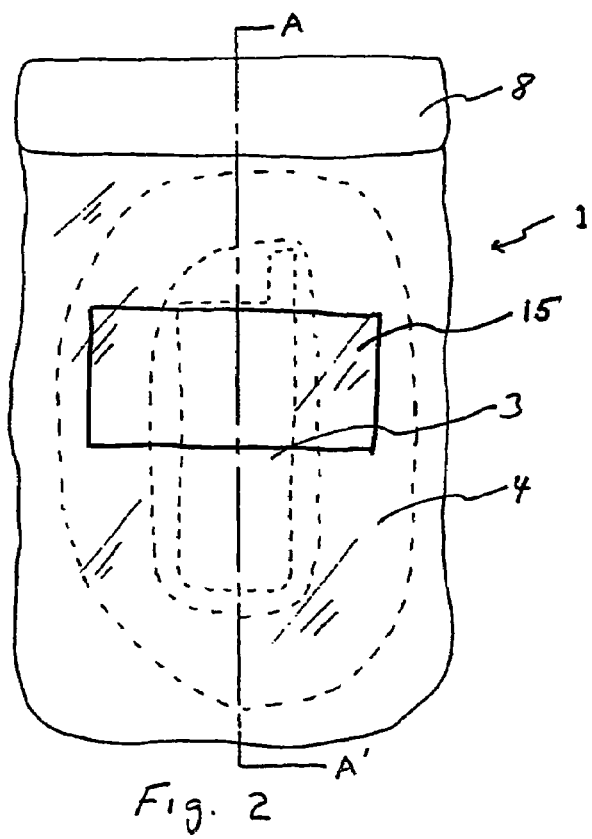
FIG. 2 shows the embodiment depicted in FIG. 1 but which has been sealed by heat sealing the open end of the bag.
Figure 3:
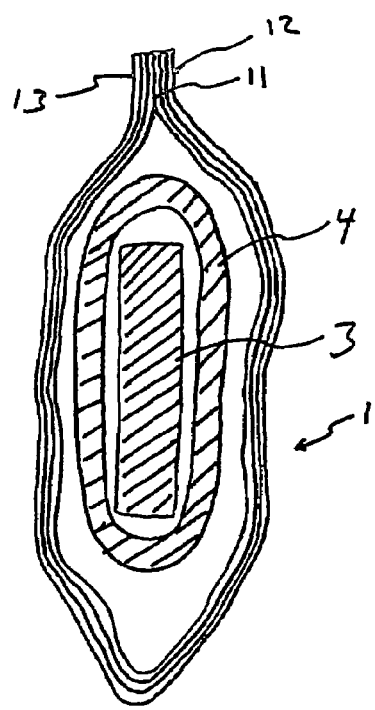
FIG. 3 is a cross-sectional view of the bag shown in FIG. 1 along line A-A'.

In a preferred embodiment the bag which is utilized in the present invention is a conventional plastic bag such as the bag illustrated in FIGS. 1-3. The bag 1 has a top opening 2 in which cell phone 3 is inserted. A spacer 4 is inserted within the bag so that it surrounds cell phone 3 to keep cell phone 3 spaced apart from the material of the bag. In particular, the spacer 4 keeps the cell phone 3, including antenna 5 spaced apart from the metal layer component of the bag.

In order to heat seal the bag, a heat seal adhesive or heat seal layer is provided on the inside surface of the bag at least in the vicinity of opening 2. FIG. 1 shows heat seal layer 6 along the top portion of the inner circumference of opening 2. Heat seal layer 6 shown in FIG. 1 extends downward from the top of opening 2 to line 7 to thereby provide a heat sealable zone 8 which extends on the inside surface of the bag between the top of the bag and line 7. Heat seal layer 6 may be replaced with any of the other seal materials disclosed herein such as a pressure sensitive adhesive layer. Thus reference numeral 6 may designate a pressure sensitive adhesive instead of a heat seal layer. It is also possible that the heat sealable layer located on the inside portion of the bag may line the entire bag in instances where the bag is made of plastic stock material which includes a heat sealing lamina which covers one entire surface of the stock material.

Figure 4:
FIG. 4 is a cross-sectional view of an embodiment of the plastic material which is used to make the bag utilized in the present invention.

FIG. 4 illustrates the layers found in a preferred bag used in the present invention. Heat sealing layer 6 is adhered to layer 9 which in turn is adhered to layer 10. Layer 9 may be a conductive layer such as metal and layer 10 may be any conventional material from which plastic bags are manufactured. Preferably layer 10 is polyethylene terephthalate (PET) and layer 9 is aluminum. Alternatively, layer 9 may be the plastic material of the bag and layer 10 may be the conductive layer (e.g., aluminum). The bag is made from the material depicted in FIG. 4 so that layer 6 is on the inside portion of the bag. Layer 6 may be confined to only a portion of the stock material so that when a bag is made from the stock material, layer 6 is confined to zone 8 as shown in FIG. 1. Alternatively layer 6 may cover all of layer 9.

FIG. 1 shows a bag wherein layer 9 is a metal and layer 10 is plastic. Thus the embodiment shown in FIG. 1 has a plastic layer on the outside of the bag. As noted above, the materials of layers 9 and 10 may be reversed so that layer 10 is the metal while layer 9 is the plastic layer.

Heat sealing is effected by pressing the two sides of bag opening so that layer 6 on one side of the bag engages layer 6 on the other side of the bag. Heat is applied so that the two portions of layers 6 which engage one another are fused or otherwise sealed by the action of the heat. A conventional heat sealing press may be used for this purpose.

After the bag has been heat sealed with the cell phone and spacer material therein, the cell phone cannot be removed from the bag without either tearing the bag or the heat seal. A torn heat seal or torn bag provides evidence that an attempt was made to remove the cell phone from the bag and use it in the restricted area. The heat seal 11 is shown between one side of the bag 12 and the other side of the bag 13 in FIG. 3. The heat seal extends downward from the bag generally in zone 8 as depicted in FIGS. 1 and 2. FIG. 2 illustrates the heat sealed bag with phone 3 and spacer material 4 contained therein.

The metal layer which is found in either layers 9 and 10 surrounds the cell phone 3 once the bag has been closed and heat sealed. This metal layer blocks or attenuates the electromagnetic radiation utilized by the cell phone or other wireless electrocommunication device.

The heat sealable layer 6 may be any conventional plastic heat sealable layer or heat sealable adhesive.

The metal layer used in the present invention is either laminated to the bag or coated thereon by conventional techniques such as sputter coating and evaporative metal coating. Metal foil such as aluminum foil may be laminated to a polyester film to make stock material used in the manufacturing of the bags. For example, aluminum foil (9 microns thick) may be laminated to a polyester film such as PET having a thickness of 12 microns. The heat seal layer may be attached to either the polyester film or the aluminum foil depending upon whether it is desired to have the aluminum on the inside or on the outside of the bag. In other words layers 9 and 10 may be metal and plastic respectively or layers 9 and 10 may be plastic and metal respectively.

The spacer 4 may comprise any conventional packing material. For example, foam and blister packing material are particularly suitable. Blister packing material comprises two sheets of plastic material which are adhered to one another in such a way so as to produce spaced apart portions of the two plastic sheets to thereby create bubbles or blisters. Preferably the cell phone is encased within the foam or blister packing material by wrapping the cell phone with a sheet of foam material or blister pack material. Alternatively, the cell phone may be inserted within a sleeve made out of foam, blister pack material or other packing materials.

The bag will be generally opaque due to the metal coating or layer. However, in some instances it is possible that the desired level of attenuation will be achieved by very thin layers of metal which are semitransparent. In a preferred embodiment a portion of the signal shielding layer is made out of transparent or semitransparent material to provide a window with the remaining portion of the signal shielding layer being opaque or less transparent than the window. Transparent materials which can be used for this purpose are well know to those skilled in the art. For example, the window may be made from a very thin metal layer which is sufficiently thin to allow sufficient light to pass through to create a window effect. An electrically conductive metal coating which is applied, for example by sputter coating, to a thickness which allows 10-15% visible light transmission is sufficient for this purpose. Furthermore, other types of transparent electrically conductive materials may be utilized for the window portion of the bag or container. Such transparent electrically conductive coatings are well known and are currently used in various applications including transparent electrodes, electroluminescent lighting, EMI/RFI shielding and liquid crystal displays, touch screens, heat mirrors and transparent window heaters. For example, indium tin oxide (ITO) with a refractive index (RI) of about 2.0 has been widely used for transparent conductive films for many applications. Any of the electrically conductive films for the above-mentioned applications are suitable for use in the present invention. In addition, various types of electrically conductive transparent metal/dielectric stacks are known. These metal/dielectric stacks are also suitable for fabricating the window portion of the bag or container. An example of a transparent electrically conductive metal/dielectric stack is a stack containing alternating layers of ITO and silver. For example, one type of stack contains 7 alternating layers of ITO and Ag.

A window 15 is shown in bag 1 in FIG. 2.

The following examples illustrate various embodiments of the invention.

EXAMPLE 1

A cell phone is placed within a bag made from vacuum metallized polyester film. The bag includes a heat sealable portion around the open end thereof. A spacer is inserted in the bag so that the spacer lies between the cell phone and the bag. The spacer prevents the antenna from touching the metal. After the bag is sealed, the cell phone is no longer able to receive and send a signal required for its operation. The metal utilized to make the metallized polyester is aluminum and is coated to form a semitransparent bag.

EXAMPLE 2

A bag was made from a 12 micron sheet of polyester film with a 9 micron layer of aluminum foil laminated thereto. It was observed that sealing a cell phone within this bag prevented the cell phone from operating due to the ability of the metal foil to block or attenuate the electromagnetic radiation utilized by the cell phone. This bag worked as long as the antenna does not touch the metal layer. The aforementioned spacer is utilized to prevent the antenna from touching the metal.

EXAMPLE 3

A metallized bag is formed from metallized plastic which includes a heat seal adhesive or a heat sealable film on one side thereof. The metallized plastic is a laminate which is PET with a layer of aluminum foil laminated to one side thereof. The heat seal adhesive or heat sealable film is applied to the foil although the heat seal adhesive or heat sealable film may alternatively be applied to the PET side. A bag is formed from this material. A cell phone is turned on and inserted within the bag. A spacer is utilized so that the cell phone is spaced apart from the foil. The bag is folded over and heat sealed so that the foil surrounds the phone. The foil which surrounds the phone effectively blocks the signal so that the phone is unable to receive a signal once it is sealed in the bag.

While the present invention has been described in terms of certain preferred embodiments, one skilled in the art will readily appreciate that various modifications, changes, omissions and substitutions may be made without departing from the spirit thereof. It is intended, therefore, that the present invention be limited solely by the scope of the following claims.

We claim:

1. A method for temporarily inactivating a wireless communication device which sends and receives an electromagnetic communication signal, said method comprising enclosing said device in a container and locking said container with a seal which prevents removal of said device from said container, said container comprising a signal shielding layer wherein said signal shielding layer comprises an electrically conductive layer or a microwave absorptive layer, said signal shielding layer being configured to surround said device when said device is enclosed within said container to thereby attenuate said communication signal and render said device inoperable; said seal being adapted so that breakage of said seal to unlock said container can be visually detected; wherein said container is a heat sealable plastic bag; said signal shielding layer is coated or laminated onto said bag; and said bag is locked by heat sealing a heat sealable portion of said bag whereby said heat sealing seals said device in said bag.

2. The method of claim 1 which further includes keeping said device spaced apart from said signal shielding layer while said device is enclosed within said bag.

3. The method of claim 2 wherein said device is kept spaced apart from said signal shielding layer by inserting a spacer layer between said bag and the device within the bag.

4. The method of claim 3 wherein said signal shielding layer is metal.

5. The method of claim 4 wherein said metal is aluminum.

6. The method of claim 3 wherein said device is a cell phone.

7. The method of claim 1 wherein said device is a cell phone.

8. The method of claim 1 wherein said electromagnetic communication signal is an infrared beam.

9. A method for temporarily inactivating a wireless communication device which sends and receives an electromagnetic communication signal, said method comprising enclosing said device in a container; said container comprising a signal shielding layer wherein said signal shielding layer comprises an electrically conductive layer or a microwave absorptive layer, said signal shielding layer being configured to surround said device when said device is enclosed within said container to thereby attenuate said communication signal and render said device inoperable, wherein said container is a bag and said device is enclosed within said bag by placing said device in an open end of said bag and then folding over said open end of said bag to thereby close said bag with said device therein.

* * * * *

UNITED STATES PATENT AND TRADEMARK OFFICE
CERTIFICATE OF CORRECTION

PATENT NO. : 7,596,850 B2
APPLICATION NO. : 10/552627
DATED : October 6, 2009
INVENTOR(S) : Barth et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 970 days.

Signed and Sealed this

Twenty-eighth Day of September, 2010

David J. Kappos
*Director of the United States Patent and Trademark Office*